Aug. 31, 1926.
W. K. McQUOWN
1,598,245
DRIVEN STEERING WHEEL
Filed Jan. 4, 1923    2 Sheets-Sheet 2
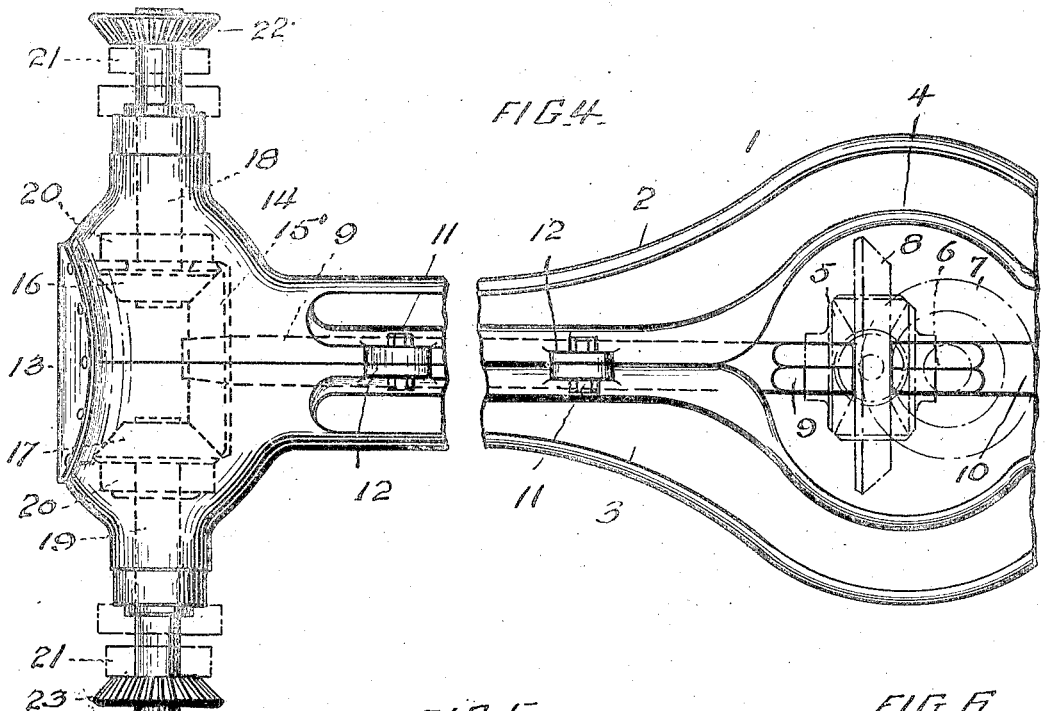
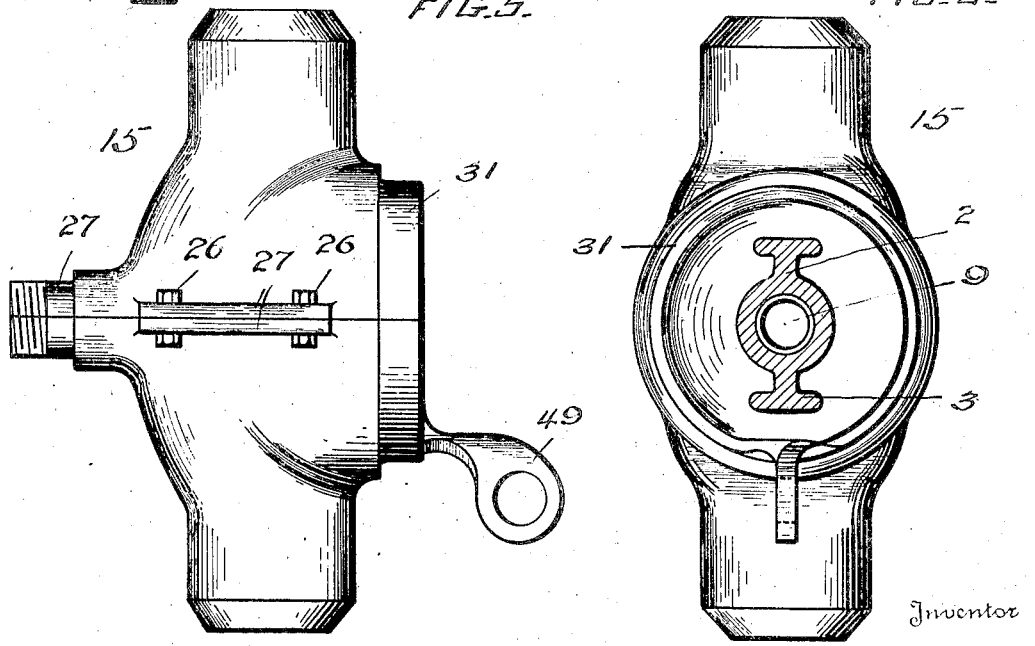
Inventor
William K. McQuown,
By Wm. F. Doyle
Attorney Patented Aug. 31, 1926.

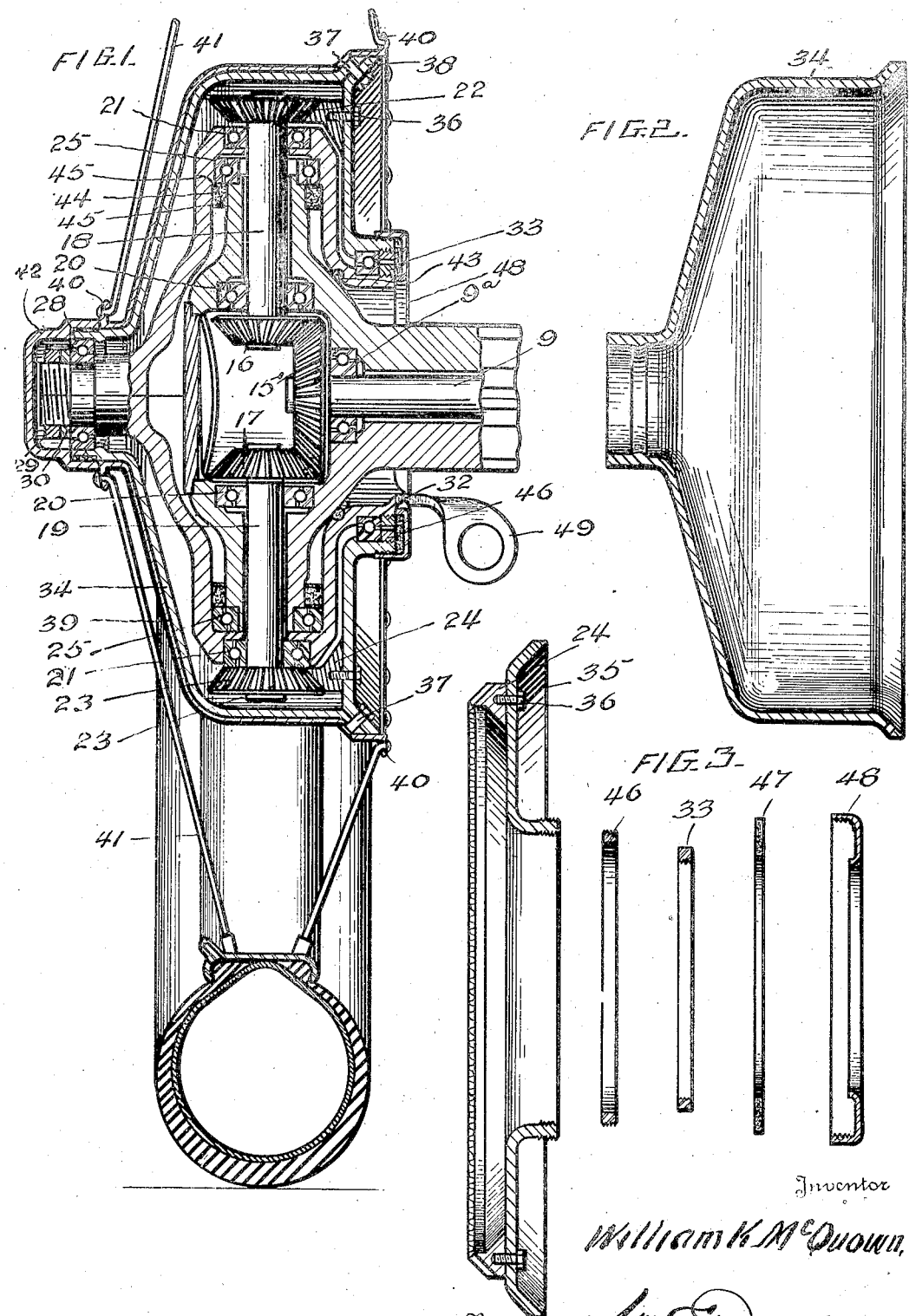

1,598,245

UNITED STATES PATENT OFFICE.

WILLIAM K. McQUOWN, OF BROOKLYN, NEW YORK.

DRIVEN STEERING WHEEL.

Application filed January 4, 1923. Serial No. 610,714.

This invention relates to a combined drive wheel and steering knuckle wherein the pivot of the wheel is directly over the tread.

The objects in view are to provide an improved construction of a simple, durable and inexpensive character for general use, including light and heavy duty work, calling for high power and slow speed for use on trucks, as well as high speed used on pleasure cars.

A further object being to enclose and protect the parts in such a way within the hub, as to protect them from damage due to exposure to the weather and to exclude dust and all other forms of foreign matter and to diminish breakage due to side strain and increase efficiency and ease of operation.

The structure showing a further development of that shown in an application executed by me on concurrent date herewith.

With the above and other objects in view the invention consists of these and other novel features of construction, combination and arrangement of parts, more fully described in the specification and finally pointed out in the claims.

Similar numerals indicate corresponding parts in all the figures of the drawings in which:

Fig. 1 is a vertical section through the improved power driven steering wheel.

Fig. 2 is a detail section of the outer hub wheel bearing plate.

Fig. 3 shows section of the inner wheel-hub bearing plate with hub-gear attached, and other coacting parts operated therefrom.

Fig. 4 is an elevation of slightly more than one-half of the axle showing an integral, hollow T-head, with the outer power transfer pinions extending therefrom.

Fig. 5 is a side view of the steering spindle.

Fig. 6 is an elevation of the inner face of the steering spindle showing the axle in section.

Reference now being had to the drawings by numerals, 1 is an axle made up of the upper and lower complementary portions 2 and 3, the cross section thereof being of any preferred form to provide lightness and strength. When the halves of the axle are assembled, a loop as shown at 4 is provided, in which the differential 5 is located, and transfer of power from the motor shaft 6, is made through bevel gears 7 and 8, to the inner ends of the wheel driving axle shafts 9 and 10.

The axle members are firmly clamped together by bolts 11, passing through ears 12, and also by plate 13, and are so formed at their outer ends as to provide a hollow T-head 14, in which the power transferring bevels are mounted and on which the steering spindle 15 is mounted.

The wheel driving axle shaft 9, (see Figures 1-4 and 6) is mounted in bearing 9$^a$ and is provided with a bevel gear 15' meshing with bevel gear 16 and 17 on the inner ends of stub shafts 18 and 19, said shafts being mounted for rotary movement on inner and outer bearings 20 and 21, and carry at their outer ends the outer power transfer bevels 22 and 23, adapted to mesh with the hub gear 24 to drive the wheel.

The steering spindle is mounted on upper and lower steering bearings 25—25, mounted at the outer ends on the T-head and consists of complementary halves to facilitate assembling.

Outer bearings 21—21 of the stub shafts 18 and 19 are mounted in the steering spindle which in turn is mounted as described, on bearings 25—25 at the ends of the T-head.

The steering spindle 15 (see Figures 5 and 6), is formed in halves as described, which are secured together by bolts 26 through flanges 27 and is provided with an outer bearing pintle on which the outer wheel hub bearing 28 is mounted and is held in place by retaining nut 29 and lock washer 30. The steering spindle is also provided with an inner enlarged wheel hub bearing portion 31, to which inner wheel hub bearing 32 is secured by lock-washer 33. Outer bearing 28 and inner bearing 32 assist in securing the parts of the steering spindle together.

The wheel hub consists of the outer wheel hub bearing plate 34 and the inner wheel hub bearing plate 35. The hub gear 24, secured to the inner plate by bolts 36 and the wheel hub bearing plates are so constructed as to enclose the other parts and are secured together by bolts 37 through flanges 38, said wheel hub rotating on outer and inner bearings 28 and 32 respectively.

Snugly fitting over the outer hub wheel bearing plate is the wheel hub shell 39 secured by bolts 37, that secure the wheel hub plates together, said shell being provided with spoke flanges 40, in which the inner ends of spokes 41 are mounted.

The hub cap 42 assists in retaining the wheel hub shell in place, protects the end of the steering spindle and retains the lubricant.

A gasket 43 confines the lubricant within the steering spindle and packing glands 44, secured between plates 45, retain the lubricant in the steering spindle bearings 25—25 and also in the outer stub shafts bearings 21—21.

The inner wheel hub bearing is retained in the inner wheel hub plate by retaining nut 46, and dust and other foreign matter is excluded by felt washer 47, which is retained in place by screw cup 48.

Projecting from steering spindle 15 is the steering arm 49 to which the usual steering rod (not shown) is secured.

The operation consists in the transfer of power from the motor through the differential located at the center of the axle, out to and within the T-heads at the ends thereof, through bevel gears mounted at the ends of the axle shafts, to bevels on the stub shafts and from thence to the hub gears. In steering, the spindle may be oscillated about the stub shafts, without disturbing the relationship between the meshing parts.

Having thus described my invention, what I claim as new and desire to secure by Letters Patent is:

1. In combination with an axle, an oscillating driven wheel, comprising rigid wheel mounting arms within the hub of the wheel, upper and lower stub shafts mounted in upper and lower extensions of said arms, an oscillating spindle, a power shaft, and means for transferring power from the power shaft to the wheel including said stub shafts.

2. An oscillating driven wheel in combination with an axle having rigid wheel mounting arms, upper and lower stub shafts mounted in the wheel mounting arms, an oscillating spindle mounted at the outer ends of the wheel mounting arms, a power shaft, and means for transferring power from the power shaft to the wheel including said stub shafts.

3. An oscillating driven wheel in combination with an axle having rigid wheel mounting arms, an oscillating spindle mounted on the wheel mounting arms, a plurality of stub shafts mounted at their inner ends in the wheel mounting arms and at their outer ends in the oscillating spindle, a power shaft, and means for transferring power from the power shaft to the wheel including said stub shafts.

4. An oscillating driven wheel in combination with an axle having rigid wheel mounting arms extending laterally, an oscillating spindle mounted on the wheel mounting arms, a plurality of stub shafts mounted in the arms and in the oscillating spindle, a power shaft mounted in the axle and extending within the hub, and means for transferring power from the power shaft to the wheel including said stub shafts.

5. The combination with a wheel having outer and inner hub bearings, of an axle having vertical wheel mounting arms located between the hub bearings, stub shafts mounted in the supporting arms, an oscillating spindle mounted on the mounting arms and supporting the hub of the wheel, and means for transferring power to the stub shafts and thence to the wheel.

6. The combination with a wheel, having outer and inner hub bearings, of an axle having vertical wheel mounting arms located between the hub bearings, stub shafts mounted in the supporting arms, an oscillating spindle mounted on the mounting arms and supporting the hub of the wheel, and a power shaft geared to the stub shafts, said stub shafts geared to the hub of the wheel.

7. The combination with a wheel having outer and inner hub bearings, of an axle having vertical wheel mounting arms, located between the hub bearings, of a length greater than the diameter of the hub bearings, stub shafts mounted in the supporting arms, an oscillating spindle mounted on the mounting arms, and supporting the hub of the wheel, and means for transferring power to the wheel.

8. The combination with a steering wheel, having outer and inner hub bearings, an oscillating spindle, a hub shell mounted on the spindle, an axle having vertical wheel mounting arms, located between the hub bearings, of a length greater than the diameter of the hub bearings, stub shafts mounted in the suporting arms, a power shaft mounted in the axle, and means for transferring power from the power shaft to the wheel.

9. The combination with a steering wheel, having outer and inner hub bearings, an oscillating spindle consisting of complementary parts, an axle having a vertical wheel mounting arm located between the hub bearings, stub shafts mounted in the supporting arms, a power shaft mounted in the axle, and means for transferring power from the power shaft to the wheel.

10. The combination with a steering wheel, having outer and inner hub bearings, an oscillating spindle, consisting of a plurality of parts and an axle having a vertical wheel mounting arm, located between the hub bearings, of a length greater than the diameter of the hub bearings, stub shafts mounted in the supporting arms, a power shaft mounted in the axle, and means for transferring power from the power shaft to the wheel.

WILLIAM K. McQUOWN